United States Patent [19]

Langley

[11] Patent Number: 5,758,917
[45] Date of Patent: Jun. 2, 1998

[54] DOG FAECES COLLECTOR

[76] Inventor: John Charles Mark Langley, 5 Fettes Row, Edinburgh EH3 6SF, United Kingdom

[21] Appl. No.: 793,177

[22] PCT Filed: Aug. 29, 1995

[86] PCT No.: PCT/GB95/02033

§ 371 Date: Feb. 28, 1997

§ 102(e) Date: Feb. 28, 1997

[87] PCT Pub. No.: WO96/07317

PCT Pub. Date: Mar. 14, 1996

[30] Foreign Application Priority Data

Sep. 3, 1994 [GB] United Kingdom ............... 9417744

[51] Int. Cl.⁶ ............................................. A01K 29/00
[52] U.S. Cl. ................. 294/1.5; 294/119.3; 15/257.3
[58] Field of Search ................ 294/1.3–1.5, 19.1, 294/119.3, 60; 901/21; 15/257.7, 257.8

[56] References Cited

U.S. PATENT DOCUMENTS

| | | | |
|---|---|---|---|
| 390,781 | 10/1888 | Hebden et al. | 15/257.7 |
| 2,749,695 | 6/1956 | Hoopingarner | 56/1 |
| 3,052,214 | 9/1962 | Johnson | 119/1 |
| 3,281,178 | 10/1966 | Fisher | 294/1 |
| 3,446,525 | 5/1969 | Jones | 294/19 |
| 3,659,891 | 5/1972 | Pettenon et al. | 294/19 R |
| 3,716,263 | 2/1973 | Gatti | 294/19 R |
| 3,744,453 | 7/1973 | Deitch | 119/1 |
| 3,777,708 | 12/1973 | Vogt | 119/1 |
| 3,786,780 | 1/1974 | Pezzino | 119/1 |
| 3,819,220 | 6/1974 | Bredt | 294/19 R |
| 3,977,422 | 8/1976 | Cabaluna | 135/66 |
| 4,003,595 | 1/1977 | Fano et al. | 294/1.5 |
| 4,236,741 | 12/1980 | Emme | 294/1.5 |
| 4,257,635 | 3/1981 | Mainprice | 294/1 |
| 4,466,647 | 8/1984 | Spevak | 291/1 BB |
| 4,509,228 | 4/1985 | Landsberger | 16/114 R |
| 4,551,061 | 11/1985 | Olenick | 901/21 |
| 4,852,924 | 8/1989 | Ines | 294/1.5 |
| 5,290,080 | 3/1994 | Yoshioka | 294/1.5 |
| 5,401,069 | 3/1995 | Swan | 294/19.1 |
| 5,634,678 | 6/1997 | Bailey | 294/1.5 |

FOREIGN PATENT DOCUMENTS

| | | |
|---|---|---|
| 108839 | 5/1984 | European Pat. Off. |
| 2444752 | 7/1980 | France. |
| 2804553 | 8/1979 | Germany. |
| 9208882 | 10/1992 | Germany. |
| 2 218 896 | 11/1989 | United Kingdom. |

*Primary Examiner*—Dean Kramer
*Attorney, Agent, or Firm*—Lahive & Cockfield, LLP

[57] ABSTRACT

A disposable, substantially lightweight faece collector device having a receptacle support and a handle portion whose light-weight construction is just sufficient for bearing an empty receptacle, but insufficient to bear, in canti-levered support, a faecally loaded receptacle. The device is adapted to be collapsible into a highly compact form, while providing a mechanism for positively and remotely manipulating the empty receptacle into a faeces loading position.

15 Claims, 2 Drawing Sheets

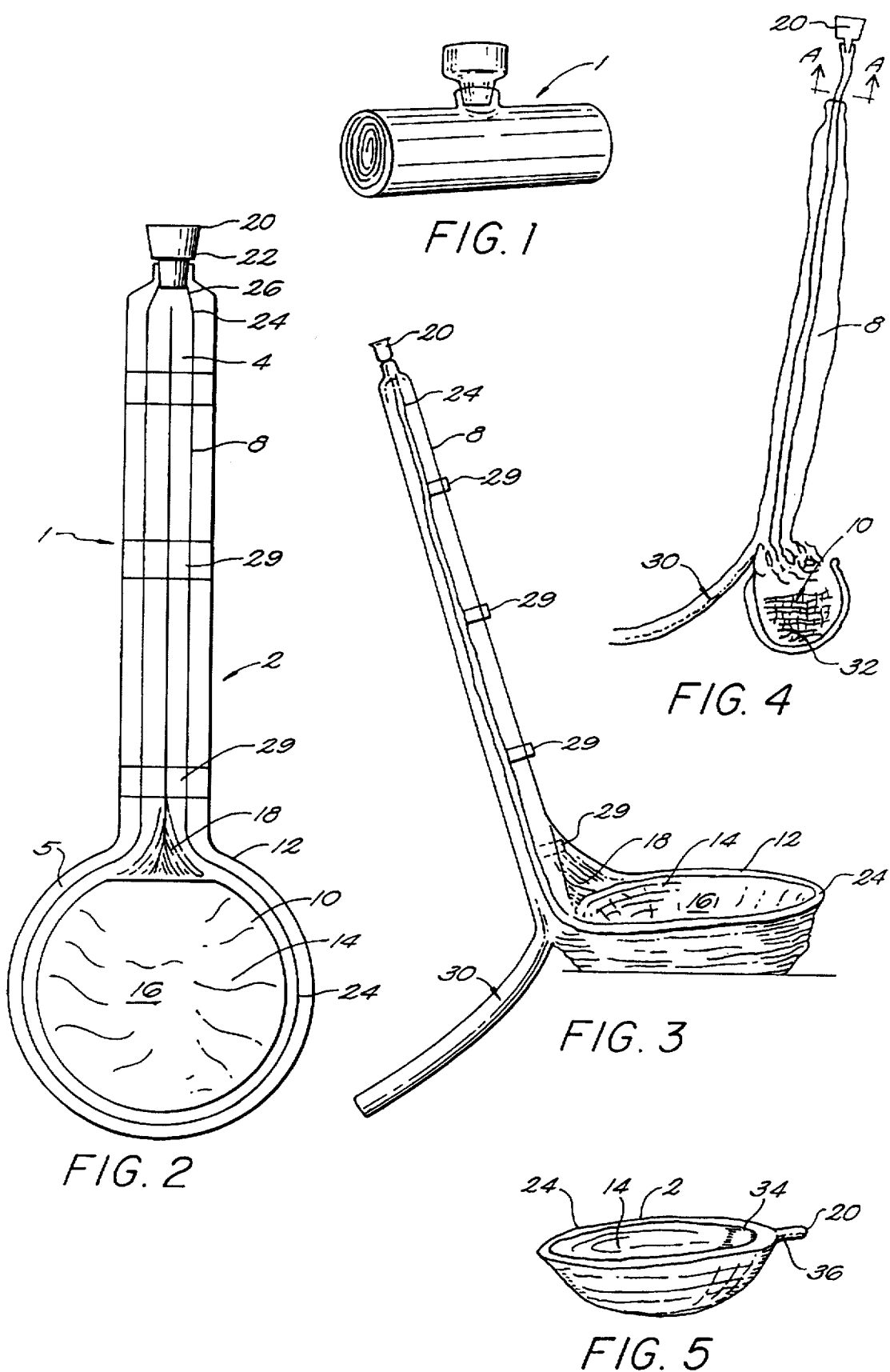

DOG FAECES COLLECTOR

BACKGROUND OF THE INVENTION

The present invention relates to a device for catching and containing dog faeces.

Animals are in general not particular about where they defecate. The streets, parks and pavements of towns everywhere are littered with, especially, dog excreta. It is unsightly, unhygienic, inconvenient and in the case of canine animals can harbour dangerous diseases such as toxocara which affects humans. Devices for the receiving and disposal of animal, particuarly dog, faeces have been proposed previously and have been disclosed in for example U.S. Pat. No. 4,466,647 (Spevak), U.S. Pat. No. 3,977,422 (Cabaluna); U.S. Pat. No. 4,003,595 (Fado) and G 2218896 (Yoshioka). Such devices including that disclosed in FR-A-2444752 have proved to be unsatisfactory for a variety of reasons including bulkiness; complexity of use; risk of faecal matter contamination; expense or simply that they are not practicable for use by dogs and their owners.

It is an object of the present invention to provide a device that can be used by dog owners in such a way as to avoid or minimise one or more of the above disadvantages.

SUMMARY OF THE INVENTION

The present invention provides an animal faeces collector device comprising a collapsible elongate handle means provided at a distal end with a receptacle having an upwardly facing deposition surface in a deployed condition of the device for receiving a faecal deposit thereon, said elongate handle means being formed and arranged for supporting the receptacle in empty and faecally-loaded conditions thereof, and said elongate handle means and said receptacle being formed and arranged so as to be collapsible into a highly compact pocketable form in a collapsed state of the device, and to be deployable to a substantially self-supporting state in a deployed state of the device, said device being of lightweight form of construction with said handle means formed and arranged so as to have a rigidity sufficient for cantilevered supporting of said upwardly facing deposition surface of said receptacle in an empty condition thereof for a substantially positive remote manipulation of the receptacle into a faeces receiving position relative to an animal, in use of the device, characterized in that said handle means is formed and arranged with a substantially restricted rigidity and a lightness of construction, to facilitate easy and economic disposability of the device, and which is substantially insufficient for cantilevered supporting of the receptacle in a faecally-loaded condition thereof; and in that said receptacle is securely connected to said handle means.

Preferably said receptacle for receiving faecal deposits is itself deployable from a substantially collapsed state to a substantially self supporting deployed state defining said upwardly facing deposition surface in said deployed state of the device for receiving faecal deposits thereon whereby in use of said device, said receptacle may be deployed and positioned under a dog in the defecating position for the sanitary collection of faecal deposits.

Such devices of the present invention are based upon inter alia a recognition, for the first time, that the receptacle and the handle means can be made to be extremely lightweight with very limited rigidity just sufficient to be self supporting and to position and direct the empty receptacle more or less accurately relative to the animal's anus. Once a faecal deposit has been made on the receptacle the latter will become considerably heavier. At this stage though it is no longer necessary to have the same directional control over the receptacle, and it is sufficient simply to be able to carry this in a convenient manner. This can though be achieved with a very lightweight handle and/or other support means which have sufficient tensile strength—which can be achieved with a much lighter construction than can a rigid handle means relying on the rigidity thereof (e.g. in leverage) to carry the same weight. Thus such devices of the invention can be made with a much more compact and thus more readily pocketable construction than can previously known devices.

In another respect the present invention provides an inflatable animal faeces collector device which device comprises a structure deployable from a first highly compact pocketable collapsed state to a second substantially self-supporting state defining and supporting a receptacle having an upwardly facing deposition surface in a deployed condition for receiving a faecal deposit thereon, said device having coupling means formed and arranged for coupling with a generally rigid elongate handle means for supporting said device at a distal end thereof, whereby in use said device may be inflated, coupled with a said more or less rigid elongate handle means and said receptacle positioned under a dog in the defecating position for the collection of faecal deposits.

Thus with collector devices according to the present invention dog faeces may be collected, contained and disposed of in a simple, hygienic and convenient manner.

Preferably the device in both aspects of the invention includes receptacle security means for safeguarding the contents of a loaded receptacle during transfer of the device to a disposal station. Desirably said receptacle security means are remotely operable. Suitable security means may comprise a closure means such as a cover or, especially in the case of a substantially flexible sheet material receptacle, a drawstring or like means for drawing in together the rim or support means of the receptacle over the contents thereof. Preferably said rim of the receptacle is provided with a support means formed and arranged to be substantially self-supporting and to support said receptacle in an open condition in said deployed state of the device, said receptacle support means being formed and arranged with said handle means so as to be collapsible together into a substantially highly compact pocketable form in said collapsed state of the device.

Preferably said collapsible elongate handle means and said receptacle support means of said collector device are formed and arranged so as to be inflatable from said collapses state to said substantially self-supporting state, such that the whole collector device is deployable by inflation. Alternatively though only said receptacle support means is inflatable and said elongate handle means is in the form of a lightweight at least slightly rigid member when in said deployed state for supporting at a distal end thereof the empty receptacle. Said lightweight member may thus be formed and arranged so as to be, for example, telescopically and/or hingedly, collapsible to a greater or lesser extent. Various lightweight members having sufficient rigidity to support themselves and an empty lightweight receptacle may be used such as for example a composite or segmented elongate member comprising a plurality of discrete elongate portions interconnected generally end-to-end and formed and arranged for articulation with respect to an adjacent portion. Preferably the length of each respective portion increases in a direction away from said receptacle and such that at each interconnection the longer of two adjacent portions extends partly under the underside of the adjacent shorter portion so as to provide a cantilevered support thereto and such that the member may be folded out from a collapsed state to a self-supporting state. Alternatively said lightweight member may comprise a plurality of portions telescopically interconnected. Desirably said lightweight members are made from suitably stiff lightweight materials such as sheet plastics or laminated paper/card strips, which may conveniently have a channel form in order to provide increased stiffness for a given weight of construction.

In another respect the present invention provides an inflatable animal faeces collector device which device comprises a structure deployable from a collapsed state to a substantially self supporting state defining an elongate handle means for supporting at a distal end thereof, a receptacle having an upwardly facing deposition surface in a deployed condition for receiving a faecal deposit thereon. Preferably said inflatable device is provided with remotely operable closure means formed and arranged for enclosing, in use, faecal deposits within said receptacle, whereby in use said device may be inflated and said receptacle positioned under a dog in the defecating position for the collection of faecal deposits and said closure means operated so as to substantially cover over the contents thereof and seal them inside so that they may be safely and hygienically disposed of.

Preferably said elongate handle means, and desirably said receptacle support means, are formed and arranged so as to be substantially flexible for coilable rolling up into said highly compact pocketable form. Alternatively said elongate handle means, and desirably said receptacle support means, are formed and arranged so as to be substantially flexible for folding up, for example in a concertina type arrangement, into said highly compact pocketable form. Desirably there is provided releasable means on the device e.g. an adhesive strip for retaining said device in said substantially highly compact pocketable form prior to use.

Preferably there is used in the construction of the inflatable receptacle or the inflatable device, a light, flexible, waterproof material such as a plastics sheet material for instance polyvinylchloride, polyamide, polyalkene e.g. polyethylene, especially high density polyethylene. Alternatively though there may be used a water resistant paper e.g. a waxed paper. In accordance with the present invention there may be provided such a device which is highly pocketable weighing as little as from 15 to 30 g, e.g. about 20 g, and having a size of as little as around 4×4×3 cm when collapsed and readily extending to a handle length of around 60 cm when deployed with a receptacle capacity which may readily be made so as to be up to around ¾ of a litre or more.

Desirably there is used a bio-degradable material to facilitate environmentally acceptable disposal of the closed receptacle with the faecal matter contained therein. Conveniently said material may be provided with a deodorizer, preferably a moisture activated deodorizer, to eliminate as far as possible noxious odours. The material may be provided with marking to advertise the device's name (or other products) or provided with luminous and/or reflective markings for increased safety in use after dark.

In the case of an inflatable elongate handle means or receptacle support means of the device this may be deployed into said self-supporting state by a user (dog owner), blowing into a compartment(s) in the device providing the structural support for the handle means or the receptacle/ support means via a suitable, generally non-return, valve means. Alternatively there may be provided a small gas supply means such as a cartridge or cylinder filled with compressed gas formed and arranged upon actuation thereof to inflate said inflatable handle means and/or such receptacle support means of the device via a said suitable non-return valve. Conveniently said gas supply means when connected to said device for the inflation thereof itself may be used to act as a said "non-return valve" thus negating the requirement for a separate non-return valve to be provided on the device.

In use of the device and upon collection of a faecal deposit, said gas supply means may be removed from the device so as to permit the device to deflate and be disposed of. In the case of the inflatable device said valve is preferably positioned on said elongate handle at the proximal, hand grip, end thereof. Said valve may be simply removable so as to allow a said inflated device/receptacle to deflate and resume a substantially compact form for disposal purposes. Alternatively deflation may be achieved by providing the valve means with a pressure release position and/or providing a separate pressure relief valve.

Preferably the elongate handle means and/or said receptacle support means of the collector device is formed and arranged so that in its collapsed state, it can be folded or desirably rolled up into a small discreet package that may be conveniently kept in the dog owner's pocket or bag until such time as it is required. Where said device is to be rolled up, said elongate handle means may be provided with an automatic coiling mechanism such as a resiliently deformable plastics strip which in a normal rest position tends to adopt a substantially coiled form.

In the case of a device of the invention with an inflatable elongate handle means, there may be provided connector means, spaced apart on said inflatable elongate handle means, formed and arranged for releasable connection with an elongate, more or less, rigid additional support element, such as a walking stick, in a deployed state of said inflatable handle means for providing a greater degree of support for said inflatable handle means and/or said receptacle in use thereof, for example in windy conditions.

In the case of a device of the invention which comprises an inflatable receptacle support means provided with a coupling means for a generally rigid elongate handle means, said coupling means may conveniently comprise a socket formed and arranged for releasable connection with the end of an elongate, more or less, rigid support member such as a walking stick.

Preferably in both aspects of the present invention said elongate handle means and said deposition surface are angled towards each other so that when said deposition surface is placed on the ground, more or less horizontally, said elongate handle means extends substantially upwardly, most conveniently at around 10 to 30 degrees from the vertical, so that in use a dog owner does not have to bend over to any great extent when holding the deployed device. Advantageously the distance between the deposition surface and any faecal matter thereon and a hand grip portion of the elongate handle means of the collector device according to both aspects of the invention is maximised so as to reduce as far as possible the risk of any faecal matter contained within the receptacle coming into contact with a user.

Preferably said deposition surface when in said deployed state has a diameter of from 5 cm to 30 cm desirably 10 cm to 20 cm, though it will be appreciated that the size and shape required will depend to a large extent on the size of the dog and of the faecal deposits generally produced by it. Various shapes of deposition surface may be used for example circular, oval, triangular or sectoral.

Most preferably with an inflatable collector device according to one aspect of the invention said device comprises a single elongate inflatable tube defining said elongate handle means and the support means of said receptacle, the end portions of said elongate inflatable tube being disposed adjacent each other and provided with a valve means. Desirably the security means for safeguarding the contents of a loaded receptacle is in the form of a draw-string which passes through said elongate tube and is connected to said valve means such that when said valve means is removed (to permit deflation of the device after use thereof) the removal of the valve pulls on both ends of said draw string so as to draw in the rim of the receptacle over the deposition surface and thereby enclose any faecal matter supported on said deposition surface.

Other forms of closure means may include adhesive strips, tabs or ribs; hook and loop type fasteners; or other sealing means formed and arranged for drawing together opposed wall means of the receptacle and/or securing closure panel or flap means in a closing position thereby to enclose and, preferably, seal in, faecal deposits within said receptacle.

Preferably there is provided at the base of said elongate handle means, adjacent said receptacle, a foot engagement portion for engaging with the underside of a user's foot so as to allow raising of the receptacle rim up from the ground so that when the closure means is operated to draw in the rim of the receptacle, this will close in above the faecal deposit resting on a central portion of the receptacle. Desirably said foot engagement portion has a rough surface formation to provide a more positive grip with the underside of a user's foot so that the engagement portion resists pulling out from under the user's foot when under tension.

Most preferably said foot engagement portion is connected to the base of the elongate means by a more or less short (e.g. 5 cm to 30 cm desirably 10–20 cm) strap portion with a distal end portion upon which a user can place a foot after receipt of a deposit in the receptacle so that upon pulling taut of the elongate handle means the receptacle rim can be raised up above the ground prior to drawing in of the closure means draw string to draw inwardly the receptacle rim to close up the receptacle above the faecal deposit.

Alternatively said receptacle comprises a bag which is deployed from said first collapsed state to said second substantially self supporting state and said receptacle support means is in the form of a resilient loop member which is deployed from a first elongate stored position to a second supporting position for providing support to said bag, said bag being provided with a pocket means or the like underneath its deposition surface, into which pocket means said loop member extends in its deployed supporting position.

BRIEF DESCRIPTION OF THE DRAWINGS

Further preferred features and advantage of the present invention will appear from the following detailed description given by way of example of some preferred embodiments illustrated with reference to the accompanying drawings in which:

FIG. 1 is a perspective view of a dog faeces collector device in a rolled up state;

FIG. 2 is a front view of the device shown in FIG. 1 in an inflated self supporting state;

FIG. 3 is a side view of device shown in FIG. 2;

FIG. 4 is a side view of the device after use in a semi-deflated state;

FIG. 5 is a side view of a second embodiment of collector device according to the invention.

DESCRIPTION OF ILLUSTRATED EMBODIMENT

Figure 6A:
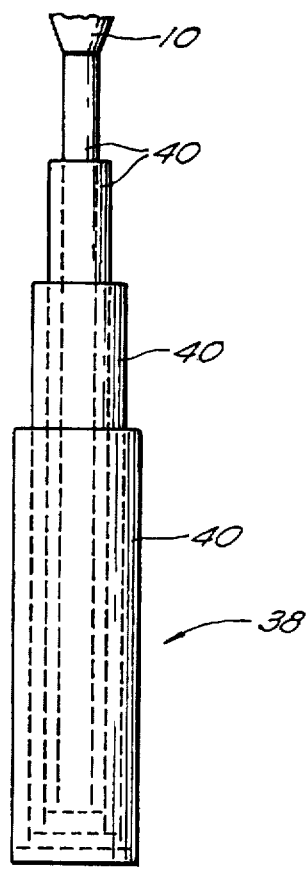
FIGS. 6A and 6B shows two different collapsible elongate handle means for use with the invention.

Reference is first made to FIG. 1 which shows a dog faeces collector device of the invention generally indicated by reference number 1. The device as shown in FIG. 1 is in a rolled up stored state so that it may readily be kept in a dog owner's pocket or the like ready to be inflated.

In more detail and with reference to FIG. 2 which shows the device 1 in an inflated ready to use state the device 1 comprises an elongate tube 2 the two ends 4, 6 of which form an elongate handle portion 8 and rim portion 9 for supporting a receptacle 10. The receptacle 10 comprises the centre portion 12 of the elongate tube 2 arranged generally arcuately for supporting a bag 14 having an upwardly facing deposition surface 16. The receptacle 10 is angled towards the handle 8 of an angle of about 110° and is supported in that position by a flexible fillet 18 (see also FIG. 3).

At the top of the handle 8 a mouthpiece 20 comprising a one-way non-return valve 22 is attached to the tube 2 so that the device 1 may be inflated by a user blowing into the mouthpiece 20. A draw string 24, the first end 26 of which is bonded to the mouthpiece 20, passes around the elongate tube 2 and has its second end 28 bonded to the mouthpiece 20. The handle portion 8 has three flexible locating rings 29 arranged for locating a stick or the like (not shown) so as to provide additional rigidity to the handle 8 if required for example in windy conditions.

As shown in FIG. 3, the device 1 has a foot engagement strap 30 which sticks out of the back of the device 1 so to provide a means for holding down the device while operating the draw string 24.

With reference to FIG. 4, once a dog has defecated into the receptacle 10 the mouthpiece 20 is withdrawn whilst the user holds down the device 1 by placing their foot on the foot engagement strap 30. As the mouthpiece is withdrawn air contained within the tube 2 escapes out of the end (shown by arrows A) and the device 1 deflates whilst at the same time the draw string 24 draws the centre portion 12 of the tube 2 together so to cover over the contents 32 of the bag 14 sealing them inside so that a user may safely and hygienically, dispose of the device 1 and the contents. It will be understood that in this way the contents so the bag are kept well away from a user holding the now limp handle 8.

The embodiment shown in FIG. 5 is generally the same as the embodiment described above with reference to FIGS. 1 to 4 except that no inflatable handle portion 8 is included. The elongate tube 2 is arranged generally arcuately for supporting the bag 14 and has an aperture 34 which may have a variety of fittings for example bayonet, screw, friction push fit etc. (not shown) for easy connection to and disconnection from a support member. The elongate tube 2 is provided with an abutment 36 so that the bag 14 may be disengaged from a support member by a users foot without the need to bend over once valve 20 has been removed and the draw string has been operated to seal the bag 14.

It will be appreciated that various modifications may be made to the above described embodiments without departing from the scope of the present invention. Thus for example the elongate handle portion 8 shown in FIGS. 1 and 2 may comprise a single elongate tube 2 or a plurality of elongate tubes 2 in side by side relation. Also said handle portion could be provided with a longitudinally extending resilient strip which has a coiled form in its unbiased state for holding the handle in a highly compact pocketable condition in the collapsed state of the handle, and which uncoils upon inflation of the elongate handle means.

In the second embodiment shown in FIG. 5 the support member may be of any suitable type including for example a walking stick. Preferably though said support member is collapsible to at least some extent e.g. telescopic or snapable plastic strip which is coilable.

FIG. 6 shows two different embodiments of collapsible elongate handle means which could be used as an alternative to the inflatable member described above with reference to FIGS. 1 to 4 or as a support member for use with the embodiment described with reference to FIG. 5.

FIG. 6(a) shows a telescopic rigid member 38 in a collapsed state. The member 38 comprises four sleeves 40 gradually decreasing in diameter, each respective sleeve being slidable within another sleeve in generally known manner so as to provide a member 38 of variable length. A receptacle 10 (only partly shown) is connected to one end of the member 38.

Figure 6B:
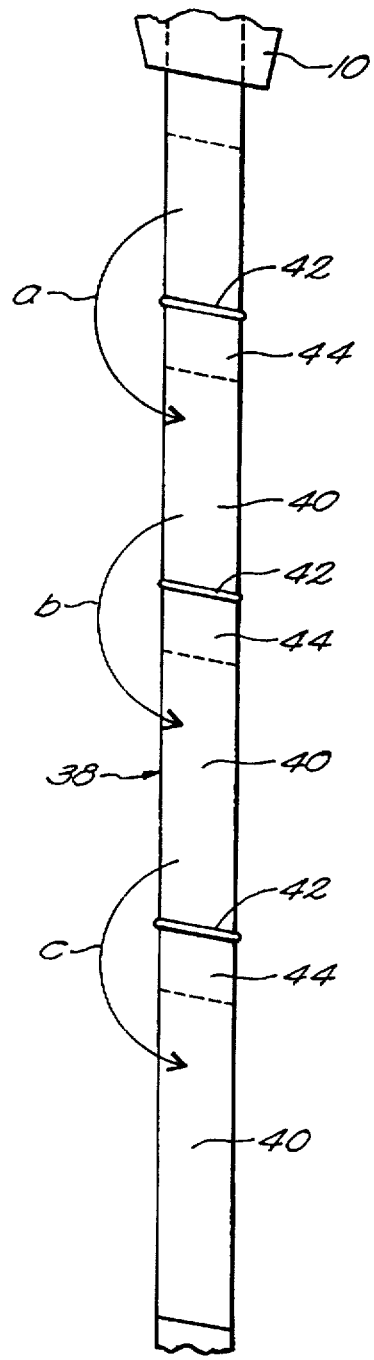

FIG. 6(b) shows an alternative arrangement for the rigid member 38. The member 38 comprises several (only three shown) member elements 40 each connected to an adjacent member element at a hinge 42. Each member element 40 increases in length in a direction away from the receptacle 10 (only partly shown) such that at each hinge 42 the longer of two adjacent member elements 40 overlaps 44 on the underside of the adjacent shorter member element so as to provide support thereto and similarly along the length of the member 10 such that the whole member is supported by each adjacent member element and for supporting the receptacle 10. The member elements 40 are arranged so that the shorter element folds onto the next adjacent longer element shown by arrow 'a' and so forth along the member 38 shown by arrows 'b' and 'c' so that the member can be folded up into a collapsed state.

I claim:

1. An animal faeces collector device, comprising a collapsible elongate handle means provided at a distal end with receptacle support means supporting a receptacle having an upwardly facing deposition surface in a deployed condition of the device for receiving a feacal deposit thereon, said elongate handle means and said receptacle support means being formed and arranged for supporting the receptacle in empty and faecally-loaded conditions thereof, and said elongate handle means, said receptacle support means and said receptacle being formed and arranged so as to be collapsible into a highly compact pocketable form in a collapsed state of the device, and to be deployable to a substantially self-supporting state in a deployed empty state of the device, said device being of lightweight form of construction with said handle means and receptacle support means formed and arranged so as to have a load bearing capability, at least in the use of the device, which is just sufficient for bearing, in cantilevered support, said handle means and said receptacle in an empty condition for enabling a substantially positive remote manipulation of said empty receptacle into a faeces-receiving position on the ground substantially below an animal's anus in use of the device, said handle means and receptacle support means being formed and arranged with a tensile strength and a substantially restricted rigidity and a lightness of construction, to maximize collapsibility into a highly compact pocketable form and to facilitate easy and economic disposability of the device, and which load bearing capability is substantially insufficient for bearing, in cantilevered support, the receptacle in a faecally-loaded condition thereof, whilst enabling the receptacle to be captively suspended in a faecally-loaded condition thereof by said handle means for conveyance of the faecally loaded device to a disposal site, in use of the device.

2. An animal faeces collector device in accordance with claim 1, which is formed and arranged so as to be inflatable from said collapsed state to said substantially self-supporting state.

3. A collector device in accordance with claim 1, wherein said elongate handle means is formed and arranged so as to be inflatable from said collapsed state to said substantially self-supporting state.

4. A collector device in accordance with claim 1, wherein said receptacle comprises support means formed and arranged so as to be inflatable from said collapsed state to said self supporting state and to support said receptacle in an open condition when disposed in said deployed state.

5. A collector device in accordance with claim 1, wherein said elongate handle means and said receptacle are formed and arranged so as to be substantially flexible for coilable rolling up into said highly compact pocketable form.

6. A collector device in accordance with claim 1, wherein said device further comprises a single elongate inflatable tube defining said elongate handle means and support means for said receptacle, said elongate inflatable tube having end portions that are disposed adjacent each other and coupled with a valve.

7. A collector device in accordance with claim 1, further comprising a foot engagement portion coupled to the base of said elongate handle means, configured for engaging with the underside of a user's foot and being arranged so as to be collapsible with said receptacle, said receptacle support means and said handle means into a highly compact pocketable form.

8. A collector device in accordance with claim 1, wherein said elongate handle means includes a resiliently deformable strip, said strip when disposed in a normal rest position has a substantially coiled form, whereby said handle means is uncoilable when deployed from said collapsed state to said deployed condition.

9. A collector device in accordance with claim 1, wherein said elongate handle means comprises a plurality of discrete elongate portions interconnected end-to-end and arranged for articulation with an adjacent portion, each said portion extending partly under said adjacent portion so as to provide a cantilevered support thereto.

10. A collector device in accordance with claim 1, wherein said elongate handle means comprises a plurality of portions telescopically interconnected so as to be extendible from said collapsed state to said deployed condition.

11. A collector device in accordance with claim 1, wherein said receptacle includes a resilient loop member deployable from a first stored position to a second supporting position for providing support to said receptacle.

12. An animal faeces collector device, which device comprises a structure deployable from a first highly compact pocketable collapsed state to a second substantially self supporting state defining and supporting a receptacle having an upwardly facing deposition surface in a deployed condition for receiving a faecal deposit thereon, and coupling means formed and arranged for coupling with a generally rigid elongate handle means for supporting said device at a distal end thereof, and said structure being formed and arranged so as to be inflatable from said collapsed state to said substantially self-supporting state whereby, in use, said device is inflated, coupled with said rigid elongate handle means, and said receptacle is positioned under the animal in a defecating position for the collection of faecal deposits so that it can be captively suspended in a faecally loaded condition thereof from said handle means upon use of the device.

13. A collector device in accordance with claims 1 or 12, wherein said device includes remotely operable receptacle security means formed and arranged for safeguarding the faecal deposits when loaded within said receptacle.

14. A collector device in accordance with claim 13, wherein said remotely operable receptacle security means comprises closure means forming a drawstring arranged with said elongate handle means, said receptacle support means and said receptacle for drawing in, over the faecal deposits loaded within said receptacle, a rim portion thereof.

15. A collector device in accordance with claims 1 or 12, wherein said elongate handle means or coupling means therefor and said deposition surface are oriented with respect to each other so that when said deposition surface is disposed on the ground generally horizontally, said elongate handle means extends generally vertically upwardly.

* * * * *